United States Patent Office 3,321,475
Patented May 23, 1967

3,321,475
ISOXAZOLE COMPOUNDS AND NON-TOXIC SALTS THEREOF
Hideo Kano, Kyoto-shi, Ikuo Adachi and Ryonosuke Kido, Toyonaka-shi, and Katsumi Hirose, Nishinomiya-shi, Japan, assignors to Shionogi & Co., Ltd., Higashi-ku, Osaka, Japan
No Drawing. Filed Oct. 8, 1965, Ser. No. 494,266
Claims priority, application Japan, July 31, 1963, 38/41,225; Nov. 20, 1964, 39/65,650; Sept. 8, 1965, 40/55,252
16 Claims. (Cl. 260—247.5)

The present application is a continuation-in-part of co-pending application Ser. No. 384,242, filed July 21, 1964.

The present invention relates to isoxazole compounds and non-toxic salts thereof. More particularly, it relates to isoxazole compounds represented by the following formula:

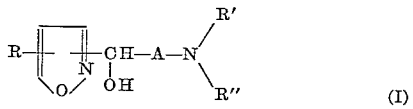

and to pharmaceutically acceptable non-toxic salts thereof.

In the above Formula I, R is a substituted or unsubstituted phenyl group and, when R is a substituted phenyl group, the substituent present on the benzene ring may be, for instance, lower alkyl (e.g., methyl, ethyl, propyl, isopropyl, butyl, isobutyl), lower alkoxy (e.g., methoxy, ethoxy, propoxy, isopropoxy, butoxy, isobutoxy) and halogen (e.g., chlorine, bromine). A is a straight or branched lower alkylene group (e.g., methylene, ethylene, propylene, isopropylene, butylene, isobutylene). R' and R" are each a hydrogen atom or a lower alkyl group (e.g., methyl, ethyl, propyl, butyl) or, when taken together with the adjacent nitrogen atom, they present a 5- to 7-membered monocyclic heterocyclic group containing, if desired, an oxygen, sulfur or an additional nitrogen atom such as pyrrolidino, piperidino, piperazino, morpholino and thiomorpholino. That is, R' and R" may represent together a tetramethylene, pentamethylene, hexamethylene, oxatetramethylene, oxapentamethylene, oxahexamethylene, azatetramethylene, azapentamethylene, azahexamethylene, thiatetramethylene, thiapentamethylene or thiahexamethylene chain.

In its preferred aspects, the invention relates to isoxazole compounds having the structural formula:

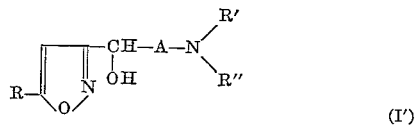

and

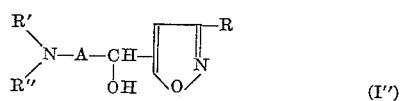

wherein R, R', R" and A each has the same significance as designated above.

The objective isoxazole compounds (I) can be prepared by reduction of aminoalkanoylisoxazole compounds represented by the formula:

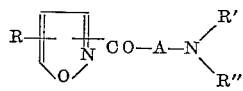

wherein R, R', R" and A each has the same significance as designated above.

Examples of the starting aminoalkanoylisoxazole compounds (II) include 3-dimethylaminoacetyl-5-phenylisoxazole,
3-diethylaminoacetyl-5-phenylisoxazole,
3-piperidinoacetyl-5-phenylisoxazole,
3-morpholinoacetyl-5-phenylisoxazole,
3-thiomorpholinoacetyl-5-phenylisoxazole,
3-pyrrolidinoacetyl-5-phenylisoxazole,
3-(2-dimethylaminopropionyl)-5-phenylisoxazole,
3-(2-diethylaminopropionyl)-5-phenylisoxazole,
3-(3-morpholinopropionyl)-5-phenylisoxazole,
3-(4-dimethylaminobutyryl)-5-phenylisoxazole,
3-(4-diethylaminobutyryl)-5-phenylisoxazole,
3-(4-dibutylaminobutyryl)-5-phenylisoxazole,
3-(4-piperidinobutyryl)-5-phenylisoxazole,
3-phenyl-5-dimethylaminoacetylisoxazole,
3-phenyl-5-diethylaminoacetylisoxazole,
3-phenyl-5-piperidinoacetylisoxazole,
3-phenyl-5-morpholinoacetylisoxazole,
3-phenyl-5-thiomorpholinoacetylisoxazole,
3-phenyl-5-pyrrolidinoacetylisoxazole,
3-phenyl-5-(2-dimethylaminopropionyl)-isoxazole,
3-phenyl-5-(2-diethylaminopropionyl)-isoxazole,
3-phenyl-5-(3-morpholinopropionyl)-isoxazole,
3-phenyl-5-(4-dimethylaminobutyryl)-isoxazole,
3-phenyl-5-(4-diethylaminobutyryl)-isoxazole,
3-phenyl-5-(4-dibutylaminobutyryl)-isoxazole,
3-phenyl-5-(4-piperidinobutyryl)-isoxazole,
3-phenyl-5-(4-pyrrolidinobutyryl)-isoxazole,
3-dimethylaminoacetyl-5-p-methylphenylisoxazole,
3-diethylaminoacetyl-5-p-methylphenylisoxazole,
3-(3-piperidinopropionyl)-5-p-methylphenylisoxazole,
3-dipropylaminoacetyl-5-p-methoxyphenylisoxazole,
3-(3-morpholinopropionyl)-5-p-methoxyphenylisoxazole,
3-dibutylaminoacetyl-5-p-chlorophenylisoxazole,
3-(3-thiomorpholinopropionyl)-5-p-bromophenylisoxazole,
3-p-methylphenyl-5-dimethylaminoacetylisoxazole,
3-p-methylphenyl-5-diethylaminoacetylisoxazole,
3-p-methylphenyl-5-(3-piperidinopropionyl)-isoxazole,
3-p-methoxyphenyl-5-dipropylaminoacetylisoxazole,
3-p-methoxyphenyl-5-(3-morpholinopropionyl)-isoxazole,
3-p-chlorophenyl-5-dibutylaminoacetylisoxazole,
3-p-bromophenyl-5-(3-thiomorpholinopropionyl)-isoxazole, etc.

According to the process of the present invention, the reduction of the aminoalkanoylisoxazole compound (II) can be carried out by treating with a metallic hydride complex such as lithium aluminum hydride, lithium borohydride, sodium borohydride and potassium borohydride in an inert solvent medium at a wide range of temperature from room temperature (10 to 30° C.) to reflux temperature. The inert solvent to be employed as the reaction medium may be selected, for instance, from ether, tetrahydrofuran, dioxane, water, aqueous alkanols, alkanols and the like in consideration of the reactivity of the starting aminoalkanoylisoxazole compound (II) and the reducing agent.

Specific examples of the isoxazole compound (I) prepared by the present process are 3-(2-dimethylamino-1-hydroxyethyl)-5-phenylisoxazole,
3-(2-diethylamino-1-hydroxyethyl)-5-phenylisoxazole,
3-(2-piperidino-1-hydroxyethyl)-5-phenylisoxazole,
3-(2-morpholino-1-hydroxyethyl)-5-phenylisoxazole,
3-(2-thiomorpholino-1-hydroxyethyl)-5-phenylisoxazole,
3-(2-pyrrolidino-1-hydroxyethyl)-5-phenylisoxazole,
3-(2-dimethylamino-1-hydroxypropyl)-5-phenylisoxazole,
3-(3-morpholino-1-hydroxyphenyl)-5-phenylisoxazole,
3-(4-dimethylamino-1-hydroxybutyl)-5-phenylisoxazole, 3-(4-diethylamino-1-hydroxybutyl)-5-phenylisoxazole,
3-(4-dibutylamino-1-hydroxybutyl)-5-phenylisoxazole,
3-(4-piperidino-1-hydroxybutyl)-5-phenylisoxazole,
3-(4-pyrrolidino-1-hydroxybutyl)-5-phenylisoxazole,
3-phenyl-5-(2-dimethylamino-1-hydroxyethyl)-isoxazole,
3-phenyl-5-(2-diethylamino-1-hydroxyethyl)-isoxazole,
3-phenyl-5-(2-piperidino-1-hydroxyethyl)-isoxazole,
3-phenyl-5-(2-piperidino-1-hydroxyethyl)-isoxazole,
3-phenyl-5-(2-morpholino-1-hydroxyethyl)-isoxazole,
3-phenyl-5-(2-pyrrolidino-1-hydroxyethyl)-isoxazole,
3-phenyl-5-(2-diethylamino-1-hydroxypropyl)-isoxazole,
3-phenyl-5-(2-morpholino-1-hydroxyethyl)-isoxazole,
3-phenyl-5-(4-dimethylamino-1-hydroxybutyl)isoxazole,
3-phenyl-5-(4-diethylamino-1-hydroxybutyl)-isoxazole,
3-phenyl-5-(4-dibutylamino-1-hydroxybutyl)-isoxazole,
3-phenyl-5-(4-piperidino-1-hydroxybutyl)-isoxazole,
3-phenyl-5-(4-pyrrolidino-1-hydroxybutyl)-isoxazole,
3-(2-dimethylamino-1-hydroxyethyl)-5-p-methylphenyl-isoxazole,
3-(2-diethylamino-1-hydroxyethyl)-5-p-methylphenyl-isoxazole,
3-(2-dipropylamino-1-hyroxypropyl)-5-p-methylphenyl-isoxazole,
3-(2-morpholino-1-hydroxypropyl)-5-p-methoxyphenyl-isoxazole,
3-(2-dibutylamino-1-hydroxyethyl)-5-p-chlorophenyl-isoxazole,
3-(2-thiomorpholino-1-hydroxypropyl)-5-p-bromophenylisoxazole,
3-p-methylphenyl-5-(2-dimethylamino-1-hydroxyethyl)-isoxazole,
3-p-methylphenyl-5-(2-diethylamino-1-hydroxyethyl)-isoxazole,
3-p-methylphenyl-5-(2-piperidino-1-hydroxypropyl)-isoxazole,
3-p-methoxyphenyl-5-(2-dipropylamino-1-hydroxyethyl)-isoxazole,
3-p-methoxyphenyl-5-(2-morpholino-1-hydroxypropyl)-isoxazole,
3-p-chlorophenyl-5-(2-butylamino-1-hydroxyethyl)-isoxazole,
3-p-bromophenyl-5-(2-thiomorpholino-1-hydroxypropyl)-isoxazole, etc.

The thus prepared isoxazole compounds (I) are liquid or solid in the free state. For convenience on preparation, they may be converted into their acid addition salts or quaternary salts, for instance, by treating the base with an acid such as hydrochloric, hydrobromic, hydroiodic, sulfuric, nitric, phosphoric, thiocyanic, carbonic, acetic, propionic, oxalic, citric, tartaric, succinic, salicylic, benzoic or palmitic acid or a quaternizing agent such as methyl chloride, ethyl chloride, ethyl bromide, methyl iodide, ethyl iodide, phenethyl bromide, methyl benzenesulfonate, ethylbenzenesulfonate, or methyl p-toluenesulfonate in a suitable solvent such as water, methanol, ethanol, ether, benzene and toluene. There are thus produced the corresponding hydrochloride, hydrobromide, hydroiodide, sulfate, nitrate, phosphate, thiocyanate, carbonate, acetate, propionate, oxalate, citrate, tartarate, succinate, salicylate, benzoate or palmitate, or the corresponding methyl chloride, methyl bromide, methyl iodide, ethyl chloride, ethyl bromide, ethyl iodide, methyl benzenesulfonate, ethyl benzene sulfonate or methyl p-toluenesulfonate.

The isoxazole compounds (I) and non-toxic salts thereof are useful as antipyretic, analgesic, antitussive and anti-inflammatory agents. They can be administered in a variety of per se conventional ways, e.g. in the form of tablets constituted e.g. by an effective single does of active compound of the invention and a major proportion of a per se conventional carrier.

The following examples represent presently-preferred embodiments of the present invention, but it is to be understood that the examples are given by way of illustration only and not of limitation. Parts by weight in those examples bear the same relation to parts by volume as do grams to millilitres.

*Example 1*

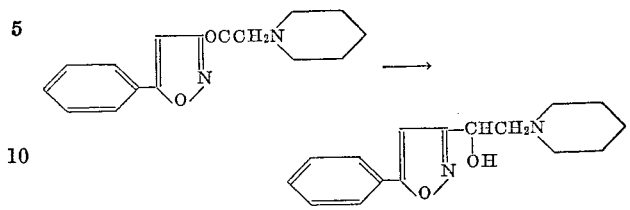

To a solution of lithium aluminum hydride (6.8 parts by weight) in anhydrous ether (250 parts by volume), there is added dropwise a solution of 3-piperidinoacetyl-5-phenylisoxazole (41.5 parts by weight) in anhydrous ether (1600 parts by volume) at room temperature (10 to 30° C.) while stirring in 20 minutes, and the resulting mixture is refluxed for 6 hours. After cooling, water (15 parts by volume) is added dropwise thereto. The resultant mixture is stirred for 5 minutes and then filtered by suction. The collected substance is extracted with hot chloroform (1000 parts by volume). The chloroform extract is combined with the filtrate and concentrated under reduced pressure. The residue is dissolved in chloroform and chromatographed on alumina. The eluate is evaporated and crystallized from 50% aqueous ethanol to give 3-(2-piperidino-1-hydoxyethyl)-5-phenylisoxazole (33.5 parts by weight) as colorless plates melting at 107 to 108° C.

*Analysis.*— Calcd. for $C_{16}H_{20}O_2N_2$: C, 70.56; H, 7.40; N, 10.29. Found: C, 70.66; H, 7.49; N, 9.96.

The hydrochloride is constituted by colorless prisms melting at 204 to 206° C., when crystallized from ethanol.

*Analysis.*—Calcd. for $C_{16}H_{20}O_2N_2 \cdot HCl$: C, 62.23; H, 6.86; N, 9.07. Found: C, 62.14; H, 7.08; N, 9.37.

The citrate is constituted by colorless prisms melting at 143 to 145° C., when crystallized from a mixture of ethanol and acetone.

*Analysis.*—Calcd. for $C_{16}H_{20}O_2N_2 \cdot \frac{1}{2}C_6H_8O_7$: C, 61.94; H, 6.57; N, 7.60. Found: C, 61.93; H, 6.82; N, 8.00.

The starting material of this example, 3-piperidinoacetyl-5-phenylisoxazole, is prepared by reacting 3-chlorocarbonyl-5-phenylisoxazole with diazomethane in ether at room temperature, reacting the resultant 3-diazoacetyl-5-phenylisoxazole with dried hydrogen chloride in chloroform at room temperature and reacting the resulting 3-chloroacetyl-5-phenylisoxazole with piperidine in benzene at room temperature.

*Example 2*

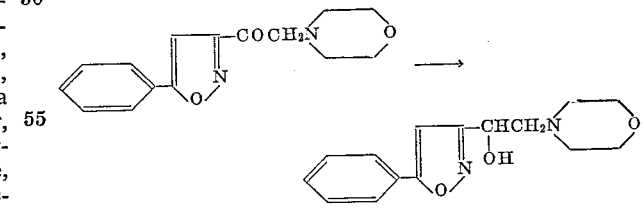

To a solution of lithium aluminum hydride (3.8 parts by weight) in anhydrous ether (150 parts by volume), there is added dropwise a solution of 3-morpholinoacetyl-5-phenylisoxazole (25.0 parts by weight) in anhydrous ether (1500 parts by volume at room temperature (10 to 30° C.) while stirring, and the resulting mixture is refluxed for 6 hours. The reaction mixture is treated as in Example 1 to give 3-(2-morpholino-1-hydroxyethyl)-5-phenylisoxazole (20.0 parts by weight) as colorless needles melting at 139 to 140° C. (crystallized from 95% ethanol).

*Analysis.*—Calcd. for $C_{15}H_{18}O_3N_2$: C, 65.67; H, 6.61; N, 10.21. Found: C, 65.68; H, 6.71; N, 10.13.

The hydrochloride is constituted by colorless needles melting at 189 to 190° C., when crystallized from ethanol.

*Analysis.*—Calcd. for C₁₅H₁₈O₃₃N₂·HCl: C, 57.97; H, 6.16; N, 9.02. Found: C, 58.37; H, 6.33; N, 9.37.

The starting material of this example, 3-morpholinoacetyl-5-phenylisoxazole, is prepared by reacting 3-chlorocarbonyl-5-phenylisoxazole with diazomethane in ether at room temperature, reacting the resultant 3-diazoacetyl-5-phenylisoxazole with dried hydrogen chloride in chloroform at room temperature and reacting the resulting 3-chloroacetyl-5-phenylisoxazole with morpholine in benzene at room temperature.

*Example 3*

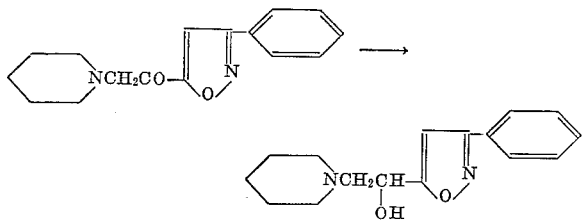

To a solution of 3-phenyl-5-piperidinoacetylisoxazole (20.0 parts by weight) in anhydrous ethanol (800 parts by volume), there is dropwise added a solution of sodium borohydride (1.33 parts by weight) in anhydrous ethanol (500 parts by volume) at room temperature (10 to 30° C.) while stirring, and the resulting mixture is stirred at 50° C. for 1.5 hours. After cooling, the reaction mixture is acidified with 10% hydrochloric acid and concentrated under reduced pressure. The residue is added with water, made alkaline with 10% sodium hydroxide solution and extracted with chloroform. The chloroform extract is washed with water, dried over anhydrous potassium carbonate and concentrated. The residue is dissolved in acetone and treated with ethanolic hydrochloric acid. The precipitate is collected by filtration and recrystallized from ethanol to give 3-phenyl-5-(2-piperidino-1-hydroxyethyl)-isoxazole hydrochloride (3.2 parts by weight) as colorless prisms melting at 229.5 to 230.5° C.

*Analysis.*—Calcd. for C₁₆H₂₀O₂N₂·HCl: C, 62.23; H, 6.81; N, 9.08. Found: C, 62.41; H, 6.96; N, 9.12.

The starting material of this example, 3-phenyl-5-piperidinoacetylisoxazole, is prepared by reacting 3-phenyl-5-chlorocarbonylisoxazole with diazomethane in ether at room temperature, reacting the resultant 3-phenyl-5-diazoacetylisoxazole with dried hydrogen chloride in chloroform at room temperature and reacting the resulting 3-phenyl-5-chloroacetylisoxazole with piperidine in benzene at room temperature.

*Example 4*

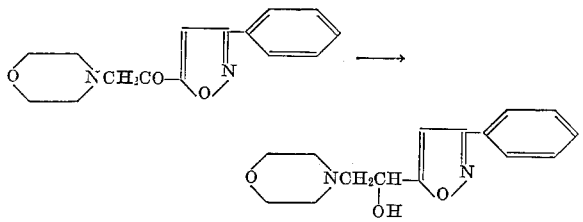

To a solution of 3-phenyl-5-morpholinoacetylisoxazole (47 parts by weight) in anhydrous ethanol (2500 parts by volume), there is dropwise added a solution of sodium borohydride (2 parts by weight) in anhydrous ethanol (500 parts by volume) at room temperature (10 to 30° C.) while stirring, and the resulting mixture is stirred at 50° C. for 30 minutes. After cooling, the reaction mixture is acidified with 10% hydrochloric acid and concentrated under reduced pressure. The residue is added with water, made alkaline with 10% sodium hydroxide solution and extracted with chloroform. The chloroform extract is washed with water, dried over anhydrous potassium carbonate and concentrated. The residue is crystallized from 90% ethanol to give 3-phenyl-5-(2-morpholino-1-hydroxyethyl)-isoxazole (18 parts by weight) as colorless plates melting at 119 to 120° C.

*Analysis.*—Calcd. for C₁₅H₁₈O₃N₂: C, 65.67; H, 6.61; N, 10.21. Found: C, 65.69; H, 6.83; N, 10.38.

The hydrochloride is constituted by colorless plates melting at 210 to 211.5° C., when crystallized from ethanol.

*Analysis.*—Calcd. for C₁₅H₁₈O₃N₂·HCl: C, 57.97; H, 6.12; N, 9.02. Found: C, 58.08; H, 6.36; N, 9.07.

The starting material of this example, 3-phenyl-5-morpholinoacetylisoxazole, is prepared by reacting 3-phenyl-5-chlorocarbonylisoxazole with diazomethane in ether at room temperature, reacting the resultant 3-phenyl-5-diazoacetylisoxazole with dried hydrogen chloride in chloroform at room temperature and reacting the resulting 3-phenyl-5-chloroacetylisoxazole with piperidine in benzene at room temperature.

*Example 5*

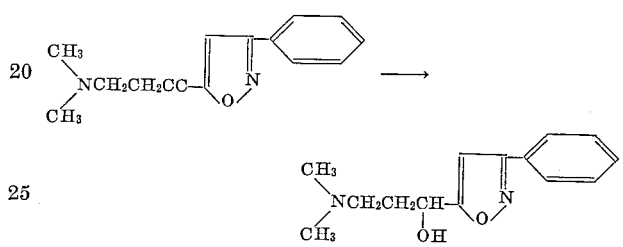

To a solution of 3-phenyl-5-(3-dimethylaminopropionyl)-isoxazole (56 parts by weight) in anhydrous ethanol (800 parts by volume), there is dropwise added a solution of sodium borohydride (2.7 parts by weight) in anhydrous ethanol (80 parts by volume) at room temperature while stirring, and the resulting mixture is stirred at 50° C. for 30 minutes. The reaction mixture is treated as in Example 4 to give 3-phenyl-5-(3-dimethylamino-1-hydroxypropyl)-isoxazole (28 parts by weight) as colorless prisms melting at 88.5 to 90° C. (crystallized from petroleum benzin).

*Analysis.*—Calcd. for C₁₄H₁₈O₂N₂: C, 68.29; H, 7.32; N, 11.38. Found: C, 68.09; H, 7.60; N, 11.00.

The hydrochloride is constituted by colorless plates melting at 145 to 147° C., when crystallized from a mixture of ethanol and ether.

*Analysis.*—Calcd. for C₁₄H₁₈O₂N₂·HCl: C, 59.47; H, 6.73; N, 9.91. Found: C, 59.60; H, 6.95; N, 10.21.

The starting material of this example, 3-phenyl-5-(3-dimethylaminopropionyl)-isoxazole, is prepared by reacting 3-phenyl-5-acetylisoxazole with formaldehyde and dimethylamine hydrochloride in dioxane containing hydrochloric acid under refluxing.

*Example 6*

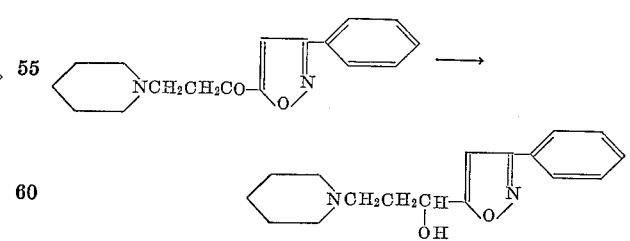

To a solution of 3-phenyl-5-(3-piperidinopropinoyl)-isoxazole (16 parts by weight) in anhydrous ethanol (250 parts by volume), there is dropwise added a solution of sodium borohydride (1.1 parts by weight) in anhydrous ethanol (40 parts by volume) at room temperature while stirring, and the resulting mixture is stirred at 50° C. for 30 minutes. The reaction mixture is treated as in Example 4 to give 3-phenyl-5-(3-piperidino-1-hydroxypropyl)-isoxazole (15.5 parts by weight) as colorless prisms melting at 83 to 84° C. (crystallized from petroleum benzin).

*Analysis.*—Calcd. for C₁₇H₂₂O₂N₂: C, 71.30; H, 7.73; N, 9.78. Found: C, 70.89; H, 7.54; N, 9.58.

The hydrochloride is constituted by colorless prisms melting at 164 to 165.5° C., when crystallized from a mixture of ethanol and acetone.

*Analysis.*—Calcd. for $C_{17}H_{22}O_2N_2 \cdot HCl$: C, 63.26; H, 7.13; N, 8.69. Found: C, 63.14; H, 7.38; N, 8.99.

The starting material of this example, 3-phenyl-5-(3-piperidinopropionyl)-isoxazole, is prepared by reacting 3-phenyl-5-acetylisoxazole with formaldehyde and piperidine hydrochloride in dioxane containing hydrochloric acid under refluxing.

*Example 7*

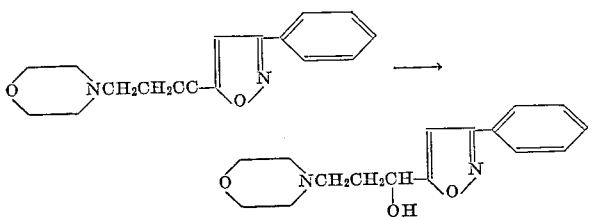

To a solution of 3-phenyl-5-(3-morpholinopropionyl)-isoxazole (54 parts by weight) in ethanol (2500 parts by volume), there is dropwise added a solution of sodium borohydride (3 parts by weight) in ethanol (120 parts by volume) at room temperature while stirring, and the resulting mixture is stirred at 50° C. for 2 hours and at room temperature for 3 hours. The reaction mixture is treated as in Example 4 to give 3-phenyl-5-(3-morpholino-1-hydroxypropyl)-isoxazole (51 parts by weight) as colorless plates melting at 88 to 89° C. (crystallized from petroleum benzin).

*Analysis.*—Calcd. for $C_{16}H_{20}O_3N_2$: C, 59.16; H, 6.51; N, 8.63. Found: C, 59.22; H, 6.65; N, 8.55.

The hydrochloride is constituted by colorless plates melting at 151 to 153° C., when crystallized from acetone.

*Analysis.*—Calcd. for $C_{16}H_{20}O_3N_2 \cdot HCl$: C, 59.16; H, 6.51; N, 8.63. Found: C, 59.22; H, 6.65; N, 8.55.

The starting material of this example, 3-phenyl-5-(3-morpholinopropionyl)-isoxazole, is prepared by reacting 3-phenyl-5-acetylisoxazole with formaldehyde and morpholine hydrochloride in anhydrous ethanol containing hydrochloric acid under refluxing.

*Example 8*

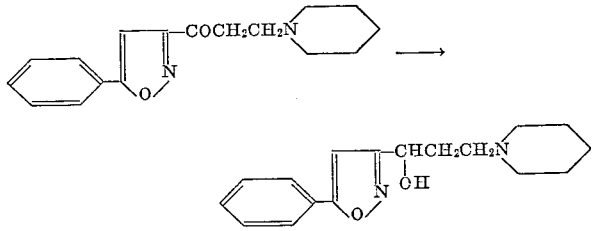

To a solution of 3-(3-piperidinopropionyl)-5-phenylisoxazole (28.4 parts by weight) in anhydrous ethanol (500 parts by volume), there is dropwise added a solution of sodium borohydride (1.9 parts by weight) in anhydrous ethanol (400 parts by volume) at room temperature while stirring, and the resulting mixture is stirred at 50° C. for 1 hour. The reaction mixture is treated as in Example 4 to give 3-(3-piperidino-1-hydroxypropyl)-5-phenylisoxazole (33 parts by weight) as liquid.

The hydrochloride is constituted by crystals melting at 174 to 176° C., when crystallized from ethanol.

*Analysis.*—Calcd. for $C_{17}H_{22}O_2N_2 \cdot HCl$: C, 63.25; H, 7.18; N, 8.56. Found: C, 63.14; H, 7.37; N, 8.68.

The starting material of this example, 3-(3-piperidinopropionyl)-5-phenylisoxazole, is prepared by reacting 3-acetyl-5-phenylisoxazole with formaldehyde and piperidine hydrochloride in dioxane containing hydrochloric acid under refluxing.

*Example 9*

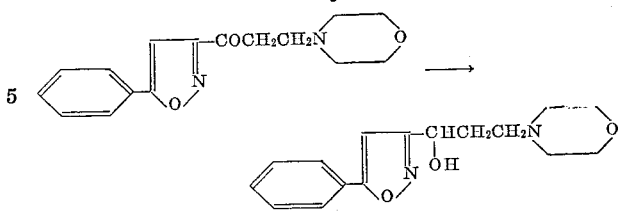

To a solution of 3-(3-morpholinopropionyl)-5-phenyl-isoxazole (14.3 parts by weight) in anhydrous ethanol (400 parts by volume), there is dropwise added a solution of sodium borohydride (0.95 part by weight) in anhydrous ethanol (200 parts by volume) at room temperature while stirring, and the resulting mixture is stirred at 50° C. for 30 minutes. The reaction mixture is treated as in Example 4 to give 3-(3-morpholino-1-hydroxypropyl)-5-phenylisoxazole (15.1 parts by weight) as liquid.

The hydrochloride is constituted by crystals melting at 204 to 206° C., when crystallized from ethanol.

*Analysis.*—Calcd. for $C_{16}H_{20}O_3N_2 \cdot HCl$: C, 59.17; H, 6.52; N, 8.63. Found: C, 59.42; H, 6.62; N, 8.70.

The starting material of this example, 3-(3-morpholinopropionyl)-5-phenylisoxazole, is prepared by reacting 3-acetyl-5-phenylisoxazole with formaldehyde and morpholine hydrochloride in anhydrous ethanol containing hydrochloric acid under refluxing.

What we claim is:

1. A member selected from the group consisting of compound of the formula:

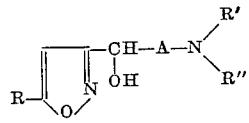

and pharmaceutically acceptable non-toxic salts thereof, wherein R is a member selected from the group consisting of phenyl, lower alkylphenyl, lower alkoxyphenyl and halophenyl, R' and R" each is a member selected from the group consisting of hydrogen and lower alkyl and R' and R" together represent a member selected from the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene, thiahexamethylene, and A is a lower alkylene.

2. A member selected from the group consisting of compound of the formula:

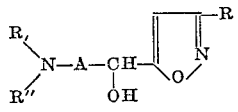

and pharmaceutically acceptable non-toxic salts thereof, wherein R is a member selected from the group consisting of phenyl, lower alkylphenyl, lower alkoxyphenyl and halophenyl, R' and R" each is a member selected from the group consisting of hydrogen and lower alkyl and R' and R" together represent a member selected from the group consisting of tetramethylene, pentamethylene, hexamethylene, oxatetramethylene, oxapentamethylene, oxahexamethylene, azatetramethylene, azapentamethylene, azahexamethylene, thiatetramethylene, thiapentamethylene, thiahexamethylene, and A is a lower alkylene.

3. 3-($\omega$-piperidino-1-hydroxy(lower)alkyl)-5-phenylisoxazole.

4. 3-($\omega$-morpholino-1-hydroxy(lower)alkyl)-5-phenylisoxazole.

5. 3-phenyl-5-($\omega$-dimethylamino-1-hydroxy(lower)alkyl)-isoxazole.

6. 3-phenyl-5-($\omega$-piperidino-1-hydroxy(lower)alkyl)-isoxazole.

7. 3-phenyl-5-(ω-morpholino-1-hydroxy(lower)-alkyl)-isoxazole.
8. 3-(2-piperidino-1-hydroxyethyl)-5-phenylisoxazole.
9. 3-(3-piperidino-1-hydroxypropyl)-5-phenylisoxazole.
10. 3-(2-morpholino-1-hydroxyethyl)-5-phenylisoxazole.
11. 3-(3-morpholino-1-hydroxypropyl)-5-phenyl-isoxazole.
12. 3-phenyl-5-(3-dimethylamino-1-hydroxypropyl)-isoxazole.
13. 3-phenyl-5-(2-piperidino-1-hydroxyethyl)-isoxazole.
14. 3-phenyl-5-(3-piperidino-1-hydroxypropyl)-isoxazole.
15. 3-phenyl-5-(2-morpholino-1-hydroxyethyl)-isoxazole.
16. 3-phenyl-5-(3-morpholino-1-hydroxypropyl)-isoxazole.

No references cited.

ALEX MAZEL, *Primary Examiner.*

JOSE TOVAR, *Assistant Examiner.*